(12) United States Patent
Corre et al.

(10) Patent No.: US 8,028,756 B2
(45) Date of Patent: Oct. 4, 2011

(54) METHOD FOR CURING AN INFLATABLE PACKER

(75) Inventors: Pierre-Yves Corre, Eu (FR); Gilles Carree, Regniere-Ecluse (FR); Stephane Metayer, Abbeville (FR)

(73) Assignee: Schlumberger Technology Corporation, Sugar Land, TX (US)

( * ) Notice: Subject to any disclaimer, the term of this patent is extended or adjusted under 35 U.S.C. 154(b) by 190 days.

(21) Appl. No.: 12/479,160

(22) Filed: Jun. 5, 2009

(65) Prior Publication Data

US 2009/0301635 A1    Dec. 10, 2009

Related U.S. Application Data

(63) Continuation-in-part of application No. 12/134,562, filed on Jun. 6, 2008, now Pat. No. 7,699,124.

(60) Provisional application No. 61/075,391, filed on Jun. 25, 2008.

(51) Int. Cl.
*E21B 33/12* (2006.01)

(52) U.S. Cl. ........................................ 166/387; 166/187

(58) Field of Classification Search .................. 166/387, 166/187
See application file for complete search history.

(56) References Cited

U.S. PATENT DOCUMENTS

| | | | |
|---|---|---|---|
| 2,441,894 A | 5/1948 | Mennecier | |
| 2,511,759 A | 6/1950 | Williams | |
| 2,581,070 A | 1/1952 | Blood | |
| 2,600,173 A | 6/1952 | Sewell et al. | |
| 2,623,594 A | 12/1952 | Sewell | |
| 2,661,064 A * | 12/1953 | Joseph | 277/338 |
| 2,675,080 A | 4/1954 | Williams | |
| 2,742,968 A | 4/1956 | Hildebrandt | |
| 2,842,210 A | 7/1958 | Ramsey | |
| 2,843,208 A | 7/1958 | Blood | |
| 3,837,947 A | 9/1974 | Malone | |
| 3,915,229 A | 10/1975 | Nicolas | |
| 3,926,254 A | 12/1975 | Evans et al. | |
| 4,236,113 A | 11/1980 | Wiley | |
| 4,500,095 A | 2/1985 | Schisler et al. | |
| 4,781,249 A | 11/1988 | Wood | |
| 4,830,105 A | 5/1989 | Petermann | |
| 4,886,117 A | 12/1989 | Patel | |
| 4,923,007 A | 5/1990 | Sanford et al. | |
| 5,048,605 A | 9/1991 | Toon et al. | |
| 5,358,039 A | 10/1994 | Fordham | |
| 5,361,836 A | 11/1994 | Sorem et al. | |
| 5,404,947 A | 4/1995 | Sorem et al. | |
| 5,439,053 A | 8/1995 | Eslinger et al. | |
| 5,605,195 A | 2/1997 | Eslinger et al. | |
| 5,613,555 A | 3/1997 | Sorem et al. | |
| 5,687,795 A | 11/1997 | Patel et al. | |

(Continued)

FOREIGN PATENT DOCUMENTS

EP    0528327    2/1993

(Continued)

*Primary Examiner* — William P Neuder
(74) *Attorney, Agent, or Firm* — David J. Smith

(57) ABSTRACT

A method of curing an inflatable packing is provided that includes providing a packer assembly having an inflatable packer around a mandrel; a polyamide bandage around the inflatable packer; and a sealing layer around both the polyamide bandage and the inflatable packer to from an airtight seal about the inflatable packer, wherein the method further includes curing the assembled packer assembly.

16 Claims, 8 Drawing Sheets

U.S. PATENT DOCUMENTS

| | | |
|---|---|---|
| 6,315,050 B2 | 11/2001 | Vaynshteyn et al. |
| 6,513,600 B2 | 2/2003 | Ross |
| 6,564,876 B2 | 5/2003 | Vaynshteyn et al. |
| 6,729,399 B2 | 5/2004 | Follini et al. |
| 6,865,933 B1 | 3/2005 | Einarson et al. |
| 6,938,698 B2 | 9/2005 | Coronado |
| 2002/0014339 A1 | 2/2002 | Ross |
| 2002/0017386 A1 | 2/2002 | Ringgenberg et al. |
| 2004/0099443 A1 | 5/2004 | Meister et al. |
| 2010/0288511 A1* | 11/2010 | Corre et al. .................. 166/387 |

FOREIGN PATENT DOCUMENTS

| | | |
|---|---|---|
| EP | 0528328 | 2/1993 |
| EP | 0702747 | 3/1996 |
| WO | 03/018956 | 3/2003 |
| WO | 2008154384 A2 | 12/2008 |

\* cited by examiner

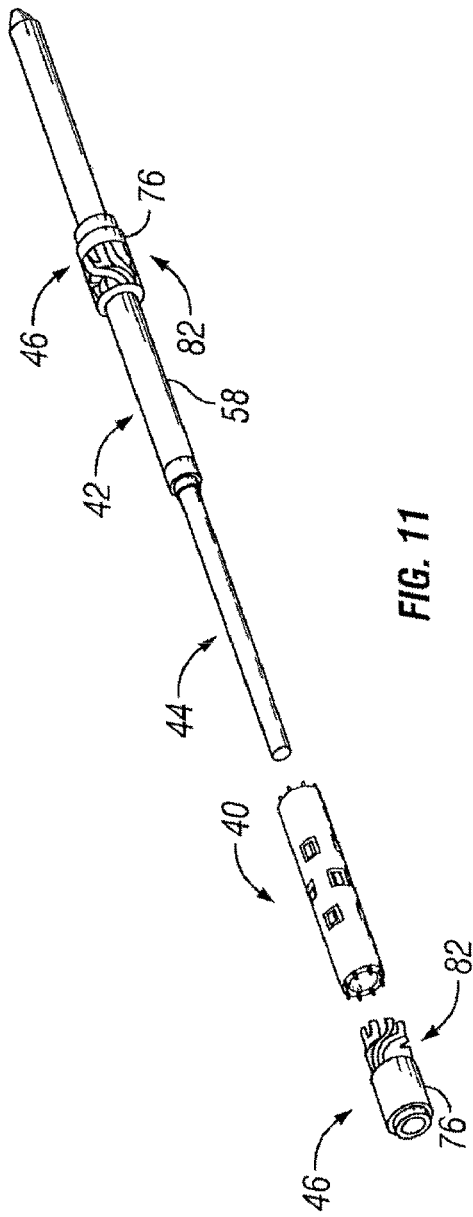
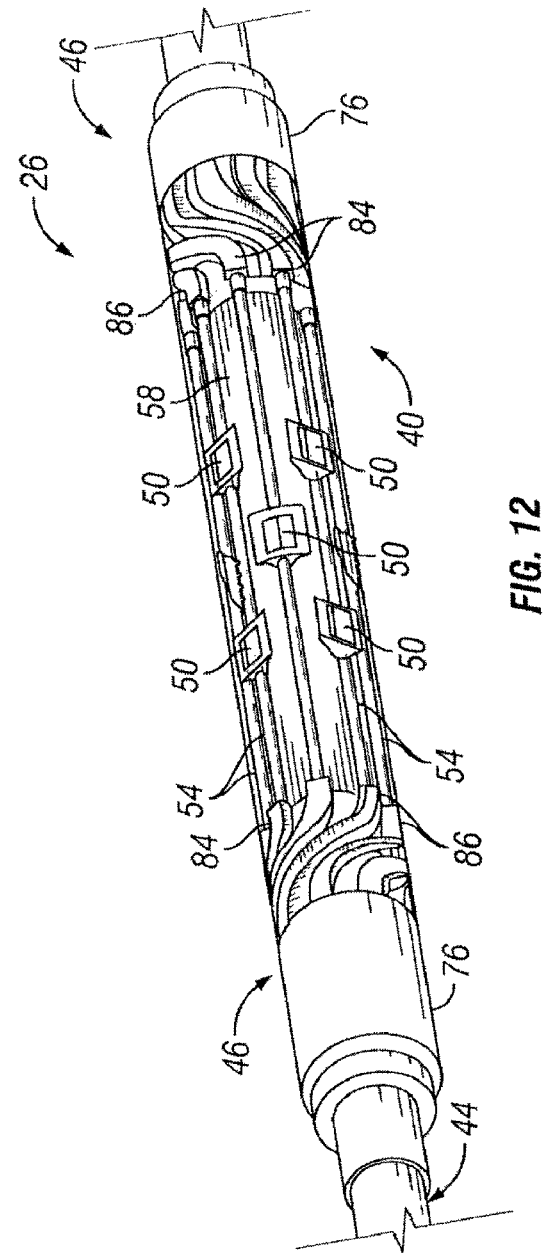

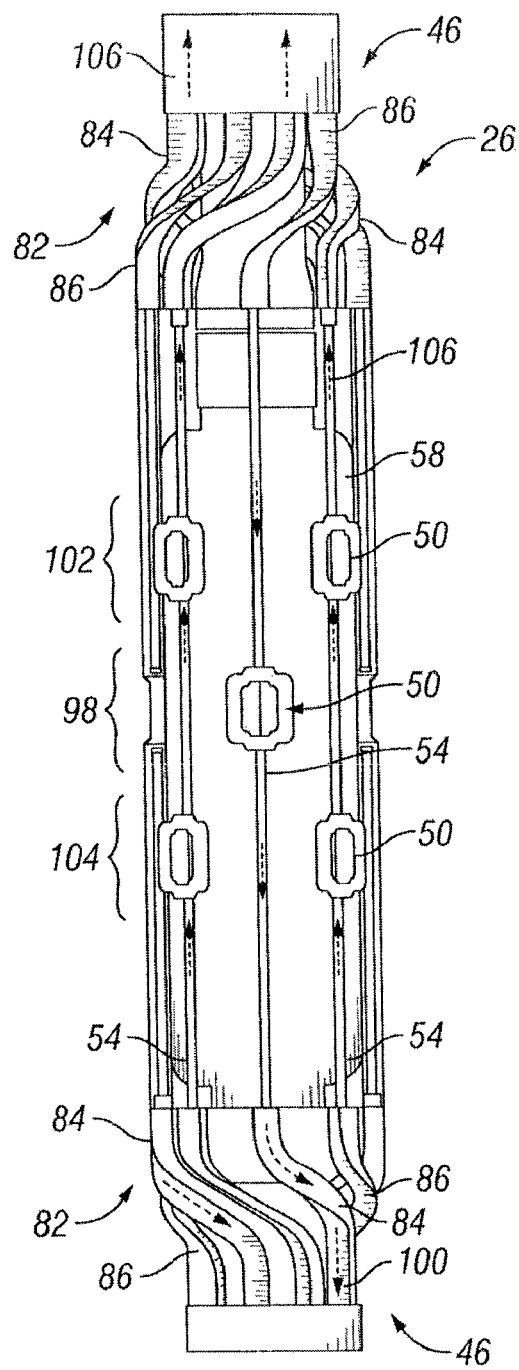
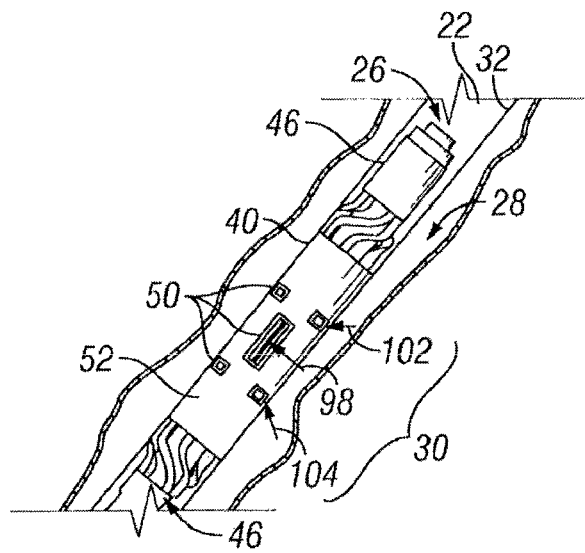
FIG. 18
FIG. 19

METHOD FOR CURING AN INFLATABLE PACKER

CROSS-REFERENCE TO RELATED APPLICATION

The present document is a continuation-in-part of prior co-pending U.S. patent application Ser. No. 12/134,562, filed on Jun. 6, 2008; which in turn is entitled to the benefit of, and claims priority under 35 U.S.C. §119(e) to U.S. Provisional Patent Application Ser. No. 61/075,391, filed on Jun. 25, 2008, the entire disclosures of each of which are incorporated herein by reference.

FIELD OF THE INVENTION

The present invention relates generally to a process for curing an inflatable packer in a pressurized air autoclave.

BACKGROUND

A variety of packers are used in wellbores to isolate specific wellbore regions. A packer is delivered downhole on a conveyance and expanded against the surrounding wellbore wall to isolate a region of the wellbore. Often, two or more packers can be used to isolate one or more regions in a variety of well related applications, including production applications, service applications and testing applications.

In some applications, packers are used to isolate regions for collection of formation fluids. For example, a straddle packer can be used to isolate a specific region of the wellbore to allow collection of fluids. A straddle packer uses a dual packer configuration in which fluids are collected between two separate packers. The dual packer configuration, however, is susceptible to mechanical stresses which limit the expansion ratio and the drawdown pressure differential that can be employed.

An addition problem with inflatable packers in general, is that they are typically cured in an air autoclave. Prior to curing, a polyamide bandage is typically wrapped around the inflatable packer at a given tension, to apply a pressure on the outside diameter of the inflatable packer. This polyamide bandage is then removed after curing. This process has several weaknesses. For example, the polyamide bandage doesn't seal the inflatable packer against exposure to air. As such, the rubber of the inflatable packer is exposed to high pressure air in the autoclave. This introduction of air into the rubber can significantly reduce the quality of the rubber due to oxidation. In addition, this air can migrate through the rubber, creating some high pressure bubbles. These bubbles can "explode" when the air pressure is released, greatly reducing the quality of the rubber. Also, the polyamide bandage itself is exposed to pressurized air in the autoclave, risking oxidation to the polyamide bandage and resulting property losses in the polyamide bandage. As such, a need for a new inflatable packer curing process exists.

SUMMARY OF THE INVENTION

In one embodiment, the present invention provides a system and method for collecting formation fluids through a single packer having at least one window or drain located within the single packer. The single packer is designed with an outer layer that expands across an expansion zone to create a seal with a surrounding wellbore wall. The drain is located in the outer layer between its axial ends for collecting formation fluid. The collected fluid is routed from the drain to an axial end of the outer layer via a fluid flow passage. Additionally, mechanical fittings are mounted at the axial ends of the outer layer, and at least one of the mechanical fittings comprises one or more flow members coupled to the flow passage to direct the collected fluid from the packer. The one or more flow members are designed to move in a manner that freely allows radial expansion and contraction of the outer layer.

In another embodiment, the present invention includes curing an inflatable packer in a manner that protects the inflatable packer from oxidation. For example, in one embodiment a sealing layer is disposed around a polyamide bandage, which in turn is disposed about an inflatable packer, such that during a curing process the sealing layer protects the polyamide bandage and the inflatable packer from oxidation.

In yet another embodiment, a polyamide bandage having an anti-oxidation layer is disposed about an inflatable packer, such that during a curing process the polyamide bandage protects the inflatable packer from oxidation.

BRIEF DESCRIPTION OF THE DRAWINGS

Certain embodiments of the invention will hereafter be described with reference to the accompanying drawings, wherein like reference numerals denote like elements, and:

FIG. 11 is an exploded view of one example of the single packer illustrated in FIG. 1, according to an embodiment of the present invention;

FIG. 12 is an orthogonal view of one example of the single packer with the outer layer shown as partially cut away, according to an embodiment of the present invention;

FIG. 18 is a partially cut away view of the single packer illustrating possible flow patterns of the collected formation fluids, according to an embodiment of the present invention; and FIG. 19 illustrates the single packer deployed in a wellbore and expanded against the surrounding wellbore wall for the collection of formation fluids through a plurality of separate windows or drains, according to an embodiment of the present invention.

DETAILED DESCRIPTION

In the following description, numerous details are set forth to provide an understanding of the present invention. However, it will be understood by those of ordinary skill in the art that the present invention may be practiced without these details and that numerous variations or modifications from the described embodiments may be possible.

The present invention generally relates in one embodiment to a system and method for collecting formation fluids through a window or drain in the middle of a single packer. The collected formation fluids are conveyed along an outer layer of the packer to a tool flow line and then directed to a desired collection location. Use of the single packer enables the use of larger expansion ratios and higher drawdown pressure differentials. Additionally, the single packer configuration reduces the stresses otherwise incurred by the packer tool mandrel due to the differential pressures. Because the packer uses a single expandable sealing element, the packer is better able to support the formation in a produced zone at which formation fluids are collected. This quality facilitates relatively large amplitude draw-downs even in weak, unconsolidated formations.

The single packer expands across an expansion zone, and formation fluids can be collected from the middle of the expansion zone, i.e. between axial ends of the outer sealing layer. The formation fluid collected is directed along flow lines, e.g. along flow tubes, having sufficient inner diameter to allow operations in relatively heavy mud. Formation fluid can be collected through one or more windows/drains. For example, separate drains can be disposed along the length of the packer to establish collection intervals or zones that enable focused sampling at a plurality of collecting intervals, e.g. two or three collecting intervals. Separate flowlines can be connected to different drains to enable the collection of unique formation fluid samples. In other applications, normal sampling can be conducted by using a single drain placed between axial ends of the packer sealing element.

Figure 1:
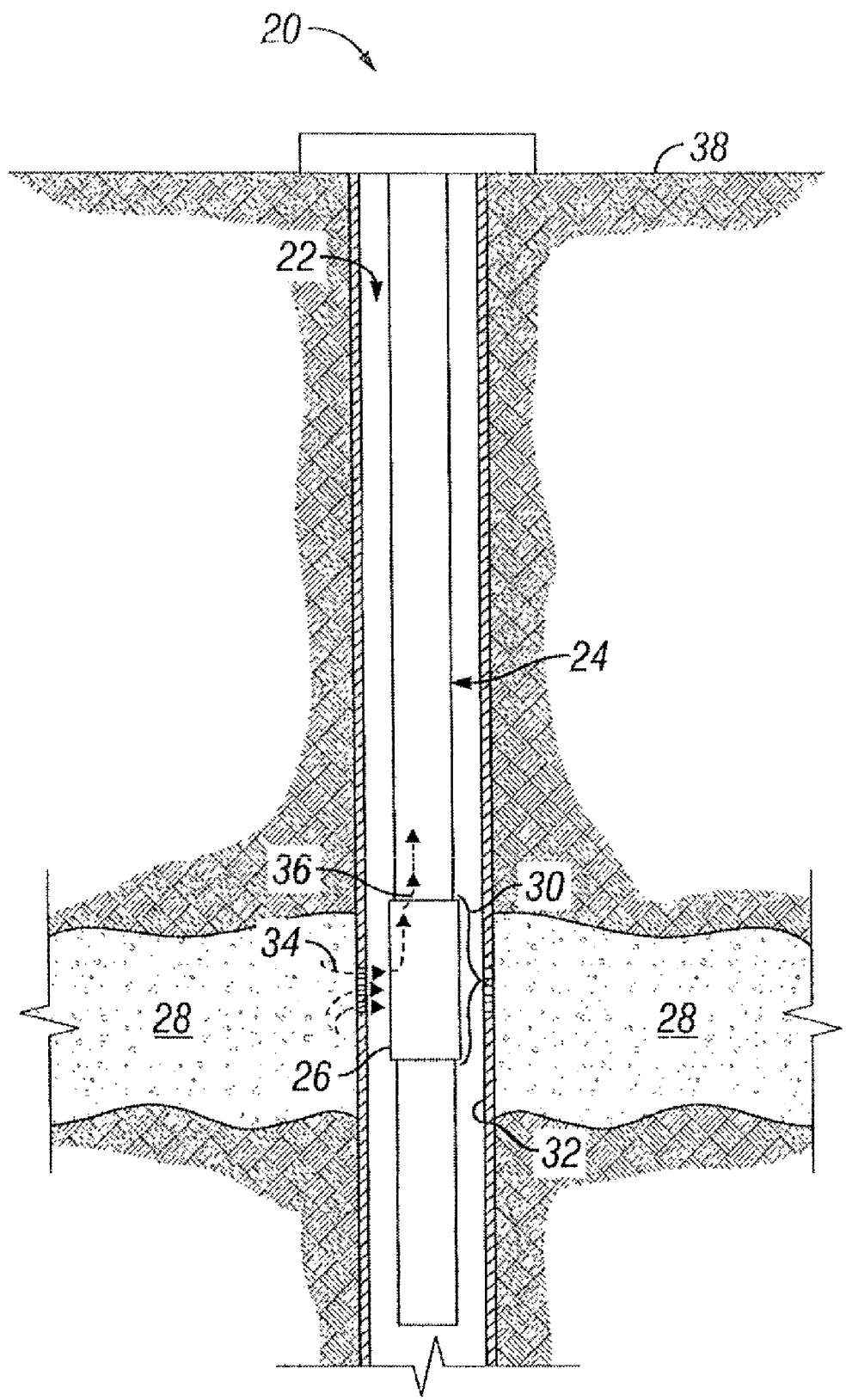
FIG. 1 is a schematic front elevation view of a well system having a single packer through which formation fluids can be collected, according to an embodiment of the present invention.

Referring generally to FIG. 1, one embodiment of a well system 20 is illustrated as deployed in a wellbore 22. The well system 20 comprises a conveyance 24 employed to deliver at least one packer 26 downhole. In many applications, packer 26 is used on a modular dynamics formation tester (MDT) tool deployed by conveyance 24 in the form of a wireline. However, conveyance 24 may have other forms, including tubing strings, for other applications. In the embodiment illustrated, packer 26 is a single packer configuration used to collect formation fluids from a surrounding formation 28. The packer 26 is selectively expanded in a radially outward direction to seal across an expansion zone 30 with a surrounding wellbore wall 32, such as a surrounding casing or open wellbore wall. When packer 26 is expanded to seal against wellbore wall 32, formation fluids can be flowed into packer 26, as indicated by arrows 34. The formation fluids are then directed to a tool flow line, as represented by arrows 36, and produced to a collection location, such as a location at a well site surface 38.

Figure 2:
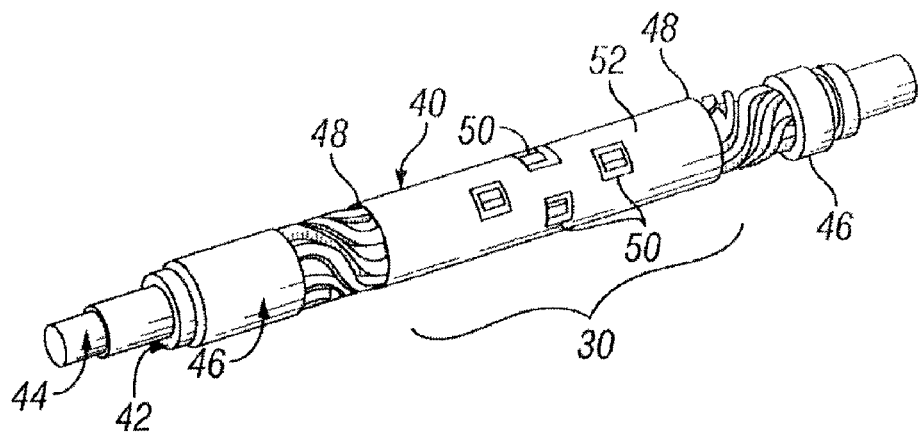
FIG. 2 is an orthogonal view of one example of the single packer illustrated in FIG. 1, according to an embodiment of the present invention.

Referring generally to FIG. 2, one embodiment of single packer 26 is illustrated. In this embodiment, packer 26 comprises an outer layer 40 that is expandable in a wellbore to form a seal with surrounding wellbore wall 32 across expansion zone 30. The packer 26 further comprises an inner, inflatable bladder 42 disposed within an interior of outer layer 40. In one example, the inner bladder 42 is selectively expanded by fluid delivered via an inner mandrel 44. Furthermore, packer 26 comprises a pair of mechanical fittings 46 that are mounted around inner mandrel 44 and engaged with axial ends 48 of outer layer 40.

Figure 3:
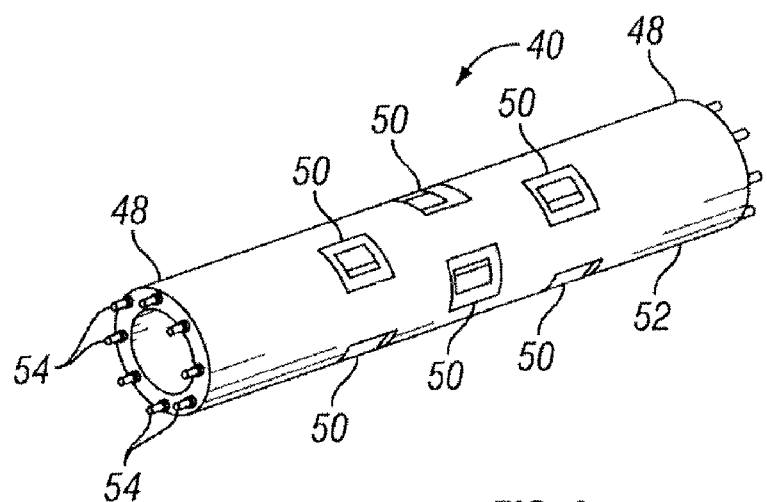
FIG. 3 is an orthogonal view of one example of an outer layer that can be used with the single packer, according to an embodiment of the present invention.
Figure 4:
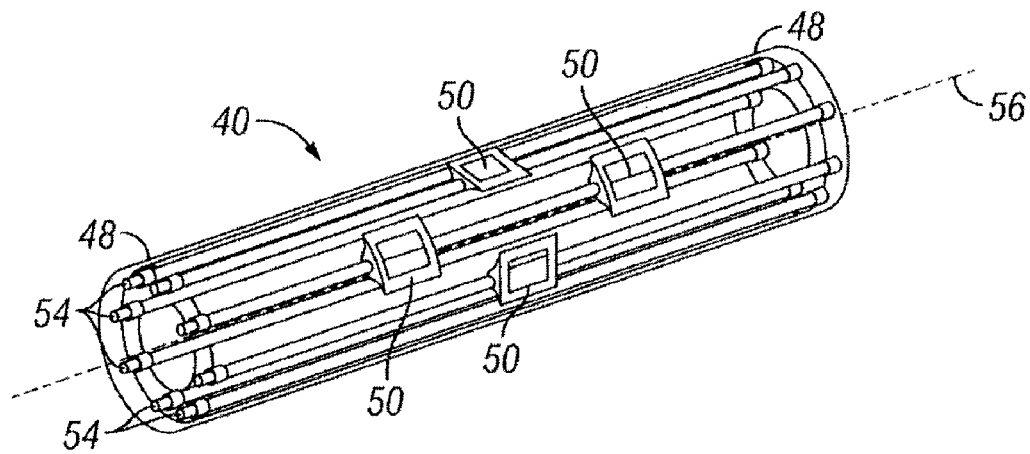
FIG. 4 is a view similar to that of FIG. 3 but showing internal components of the outer layer, according to an embodiment of the present invention.

With additional reference to FIG. 3, outer layer 40 may comprise one or more windows or drains 50 through which formation fluid is collected when outer layer 40 is expanded against surrounding wellbore wall 32. Drains 50 may be embedded radially into a sealing element 52 of outer layer 40. By way of example, sealing element 52 may be cylindrical and formed of an elastomeric material selected for hydrocarbon based applications, such as nitrile rubber (NBR), hydrogenated nitrile butadiene rubber (HNBR), and fluorocarbon rubber (FKM). A plurality of tubular members or tubes 54 can be operatively coupled with drains 50 for directing the collected formation fluid in an axial direction to one or both of the mechanical fittings 46. In one example, alternating tubes 54 are connected either to an individual central drain or to two drains located equidistant from an axial center region of the outer layer 40, respectively. As further illustrated in FIG. 4, tubes 54 can be aligned generally parallel with a packer axis 56 that extends through the axial ends of outer layer 40. In the example illustrated, the tubes 54 are at least partially embedded in the material of sealing element 52 and thus move radially outward and radially inward during expansion and contraction of outer layer 40.

Figure 5:
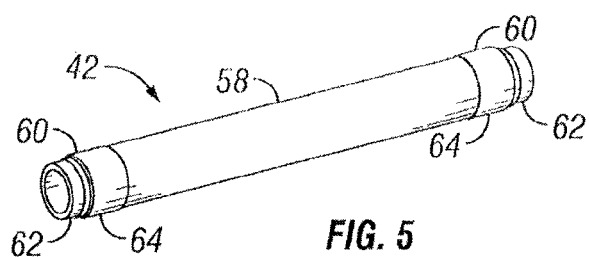
FIG. 5 is an orthogonal view of one example of an inflatable bladder that can be used with the single packer, according to an embodiment of the present invention.

Referring generally to FIG. 5, one embodiment of inflatable bladder 42 is illustrated. In this embodiment, inflatable bladder 42 comprises an inflatable membrane 58 held between membrane fittings 60 located at each of its axial ends. By way of example, each membrane fitting 60 may comprise a nipple region 62 and a skirt 64. The membrane fittings 60 are used to connect the inflatable bladder 42 to inner mandrel 44. In some applications, fittings 60 also can be used to securely retain a mechanical structure 66 of inflatable membrane 58, as illustrated in FIG. 6.

Figure 6:
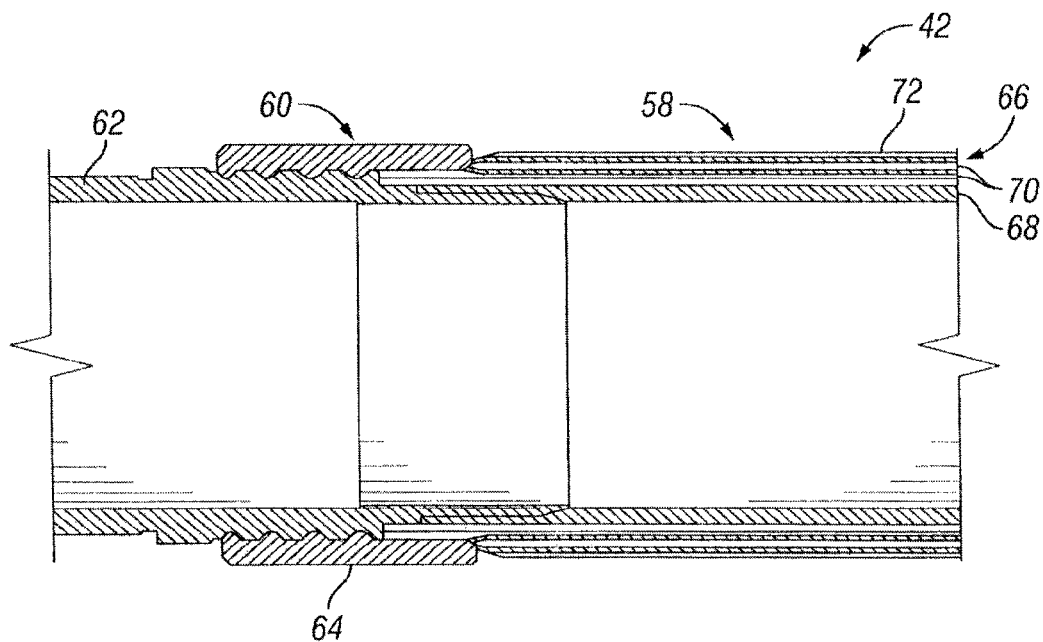
FIG. 6 is a cross-sectional view of a portion of the inflatable bladder illustrated in FIG. 5, according to an embodiment of the present invention.

In FIG. 6, one embodiment of inflatable membrane 58 is illustrated as comprising an inner elastomeric, e.g. rubber, layer 68 surrounded by mechanical structure 66. The mechanical structure 66 may comprise stiff, elongate support members 70 which may be in the form of metallic members, such as steel cables or metallic slats. An elastomeric, e.g. rubber, outer layer or cover 72 can be positioned around mechanical structure 66 to protect the mechanical structure from the well fluid and potential corrosion as well as from migration of sand or mud through the structure. Furthermore, the material of outer cover 72 can be selected to reduce friction between inflatable membrane 58 and the surrounding outer layer 40 during expansion. For example, outer cover 72 can be formed using a different compound relative to the compound used for outer layer 40. Additionally, certain fillers can be added to the materials to minimize the friction coefficient. In one specific example, outer cover 72 can be formed from FKM filled with a nano polytetrafluoroethylene (PTFE), and outer layer 40 can be formed with HNBR. It should be noted, however, that some applications may require relatively low levels of pressure to expand outer layer 40 which allows the use of other materials and simpler construction, e.g. a folded bag construction, with respect to inflatable membrane 58.

Figure 7:
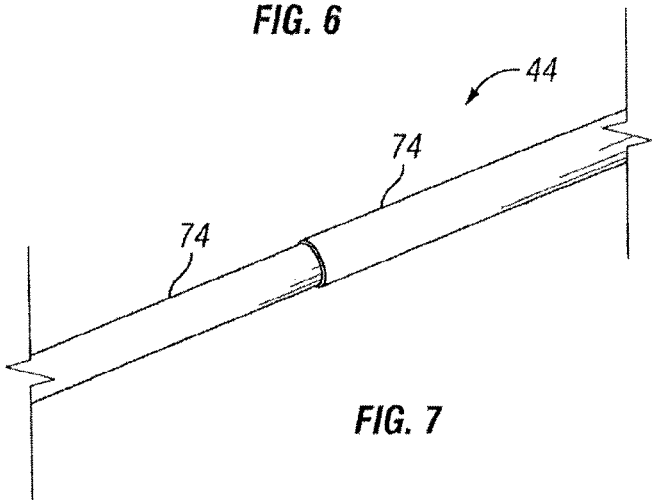
FIG. 7 is an orthogonal view of one example of a mandrel that can be positioned within the inflatable bladder, according to an embodiment of the present invention.

Referring generally to FIG. 7, one example of inner mandrel 44 is illustrated. Inner mandrel 44 may be constructed in a variety of configurations useful for delivering fluid to expand inflatable membrane 58 via appropriate passages (not shown). As illustrated, inner mandrel 44 comprises one or more tubular sections 74 through which fluid may be pumped into inflatable bladder 42. The tubular sections 74 are sized to fit securely within membrane fittings 60 of inflatable bladder 42. By way of example, inner mandrel 44 may be part of an MDT tool connected to a wireline conveyance 24. MDT tools typically comprise associated pumps, filters and electronics for conducting testing/sampling procedures.

Figure 8:
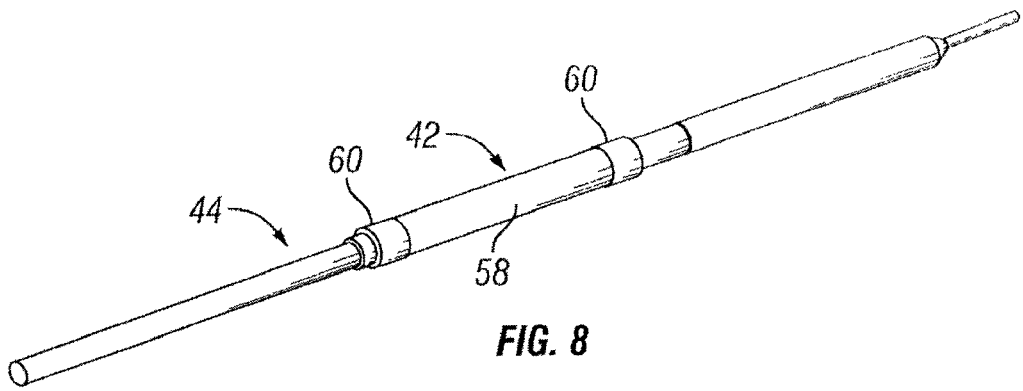
FIG. 8 is an orthogonal view of one example of the combined inflatable bladder and inner mandrel with the inflatable bladder in a contracted configuration, according to an embodiment of the present invention.
Figure 9:
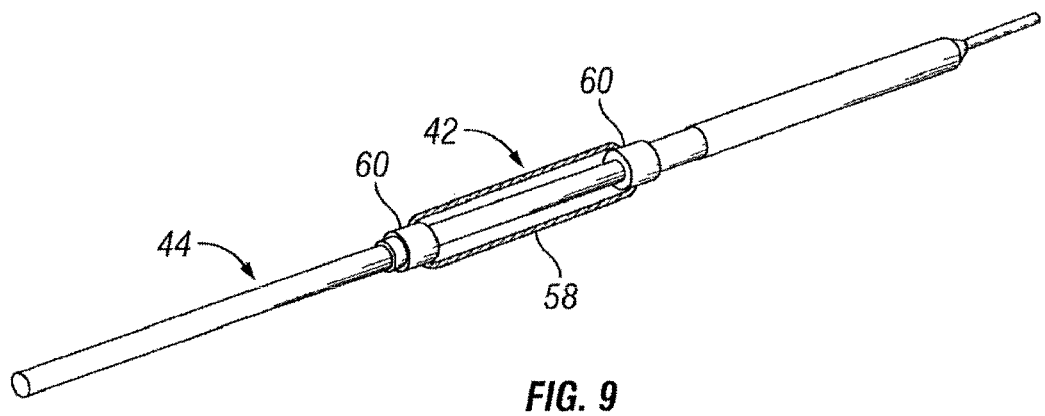
FIG. 9 is a view similar to that of FIG. 8 but showing the inflatable bladder in an inflated configuration, according to an embodiment of the present invention.

In FIG. 8, the inner mandrel 44 is illustrated as engaged within inflatable bladder 42, while inflatable bladder 42 is in a contracted configuration prior to inflation. Fluid may be pumped down through inner mandrel 44 and displaced into an interior of inflatable membrane 58 through appropriate passages or openings. The continued supply of fluid under pressure fills the inflatable membrane 58 and causes it to expand radially, as illustrated in FIG. 9.

Figure 10:
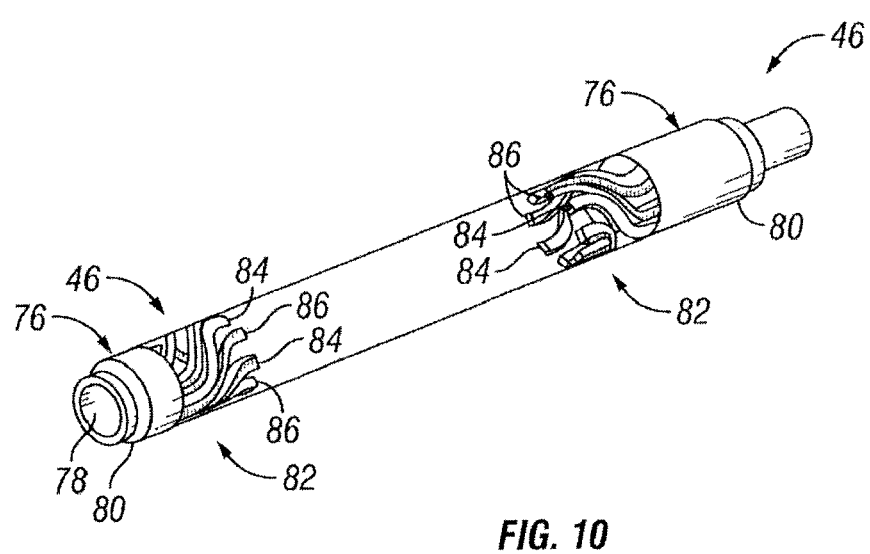
FIG. 10 is an orthogonal view of one example of mechanical fittings that can be used with the single packer, according to an embodiment of the present invention.

Referring generally to FIG. 10, one embodiment of mechanical fittings 46 is illustrated. In this embodiment, each mechanical fitting 46 comprises a collector portion 76 having an inner sleeve 78 and an outer sleeve 80 that are sealed together. Each collector portion 76 can be ported as desired to deliver fluid collected from the surrounding formation to the established flow line 36 (see FIG. 1). One or more movable members 82 are movably coupled to each collector portion 76, and at least some of the movable members 82 are used to transfer collected fluid from tubes 54, into the collector portion 76, and into flow line 36. By way of example, each movable member 82 may be pivotably coupled to its corresponding collector portion 76 for pivotable movement about an axis generally parallel with packer axis 56.

In the embodiment illustrated, a plurality of movable members 82 are pivotably mounted to each collector portion 76. The movable members 82 may comprise one or more flow members 84 movably, e.g. pivotably, coupled to one or more of the collector portions 76. Each flow member 84 is hollow and defines a flow path for conducting fluid from the tube 54 to which it is connected. The movable members 82 also may comprise one or more non-flow members 86 that also are coupled to corresponding tubes 54. However, because members 86 do not allow flow, the fluid is forced through corresponding flow members 84 at the opposite mechanical fitting 46. For the sake of example, FIG. 10 illustrates four flow members 84 alternating with four non-flow members 86 at each mechanical fitting 46. In this example, flow members 84 and non-flow members 86 are generally S-shaped and designed for pivotable connection with both the corresponding collector portion 76 and the corresponding tubes 54.

During assembly, inner mandrel 44 is inserted into inflatable bladder 42, and one of the mechanical fittings 46 is slid over inner mandrel 44 against an axial end of the inflatable bladder 42, as illustrated in FIG. 11. The outer layer 40 can then be slid over membrane 58 of inflatable bladder 42, and the second mechanical fitting 46 is moved into engagement with the outer layer 40 so that outer layer 40 is trapped between the mechanical fittings 46. Once properly aligned, the movable members 82 of each mechanical fitting 46 are coupled with corresponding tubes 54 of outer layer 40, as illustrated in FIG. 12. It should be noted that FIG. 12 does not illustrate sealing element 52 to better display the orientation of outer layer tubes 54 and the corresponding movable members 82.

Figure 13:
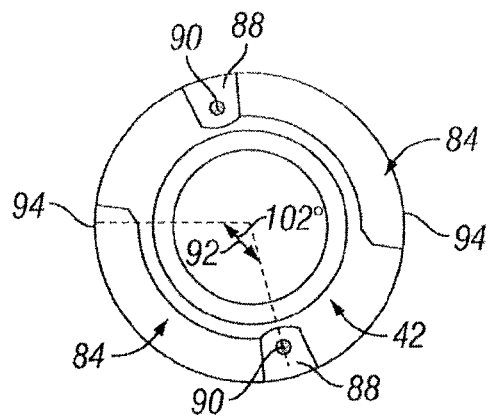
FIG. 13 is a schematic cross-sectional view illustrating movable flow members of a mechanical fitting, according to an embodiment of the present invention.

As illustrated in FIG. 13, flow members 84 may be designed with a generally curvilinear shape oriented to curve around the axial ends of inflatable bladder 42. Each flow member 84 has an attachment end 88, with a flow passage 90, designed for pivoting connection to a corresponding tube 54. Each flow member 84 also curves through a predetermined rotational angle 92, e.g. 102°, before being pivotably coupled to the collector portion 76 via a connection nipple 94 or other suitable, movable connection. The predetermined rotational angle 92 can vary and may be selected according to various factors, such as packer size and predetermined expansion ratio. The design and orientation of members 84 and 86 enable their radial movement, e.g. pivoting, during expansion of outer layer 40 without bending or otherwise stressing tubes 54.

Figure 14:
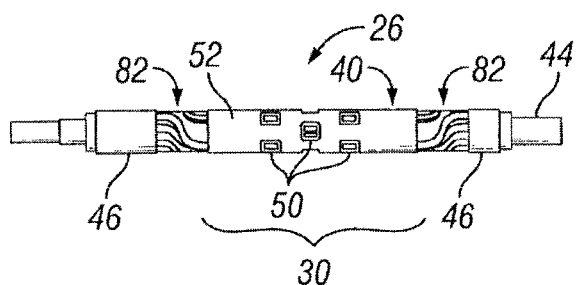
FIG. 14 is a front view of the single packer in a contracted configuration, according to an embodiment of the present invention.
Figure 15:
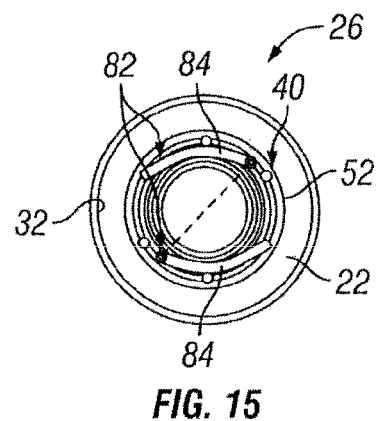
FIG. 15 is a cross-sectional view of the single packer of FIG. 14 illustrating the flow members positioned in a radially inward configuration, according to an embodiment of the present invention.
Figure 16:
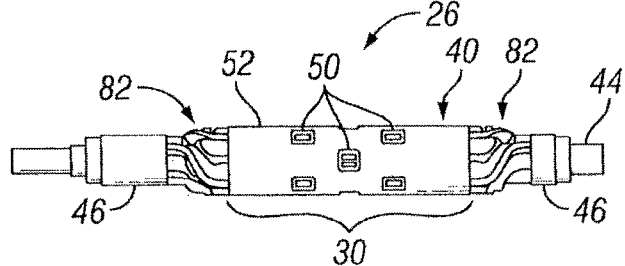
FIG. 16 is a front view of the single packer in an expanded configuration, according to an embodiment of the present invention.
Figure 17:
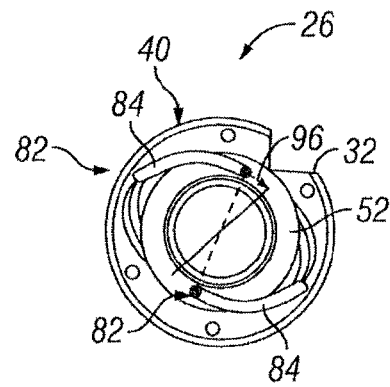
FIG. 17 is a cross-sectional view of the single packer of FIG. 16 illustrating the flow members pivoted to a radially outward configuration, according to an embodiment of the present invention.

Once the single packer 26 is assembled, it can be moved to a desired fluid collection region of wellbore 22 in a contracted configuration, as illustrated in FIG. 14. In this configuration, movable members 82 are pivoted to a contracted or radially inward position along the axial ends of inflatable bladder 42, as illustrated in FIG. 15. At the desired location within wellbore 22, expansion fluid is pumped down through inner mandrel 44 to inflate bladder 42 which, in turn, expands outer layer 40 in a radially outward direction throughout expansion zone 30, as illustrated in FIG. 16. Expansion of outer layer 40 causes movable members 82 to pivot in a radially outward direction, as illustrated best in FIG. 17. It should be noted that the pivoting of movable members 82 also causes collector portions 76 to rotate about mandrel 44 a certain degree of rotation, as represented by arrow 96. The movement of members 82 and collector portions 76 enables expansion of outer layer 40 without affecting the angular position of tubes 54 and without deforming or stressing the tubes 54.

One example of a fluid sampling technique can be described with reference to FIG. 18. In this example, individual drains 50 are disposed in a generally central zone or interval 98 and connected with corresponding individual tubes 54. Formation fluid collected through the individual drains 50 in central interval 98 flows through the corresponding tubes 54, into the corresponding flow members 84, and through the collection portion 76, as represented by arrows 100. Alternating tubes 54 comprise pairs of drains 50 with each drain of the pair being located in an outlying zone or interval 102 or 104. Interval 98 is positioned axially between intervals 102 and 104. Formation fluid collected through the drains 50 in axially outlying intervals 102, 104 flows through the corresponding tubes 54, into the corresponding flow members 84, and through the collection portion 76 located at the opposite end of packer 26, as represented by arrows 106.

Accordingly, formation fluid is collected through three different intervals. The fluid collected through the center interval 98 is routed in one direction through packer 26 to flow line 36, and fluid collected through the outlying intervals 102, 104 is routed in another direction. It should be noted, however, that packer 26 can be designed with a greater number or lesser number of collection intervals, including single collection intervals, depending and the desired fluid sampling for a given while application.

In FIG. 19, a three collection zone example of packer 26 is illustrated as expanded in wellbore 22. The single packer 26 expands outer layer 40 and sealing element 52 against the surrounding wellbore wall 32 to form a seal across the entire expansion zone 30. Formation fluid is collected through internal drains positioned to extend radially into outer layer 40. The use of three intervals 98, 102 and 104 allows the axially outlying drains 50 to be used for protecting the drains 50 located in center interval 98 from contamination.

During initial retrieval of fluid from formation 28, contaminated fluid is sometimes absorbed through all of the drains 50. As the sampling phase is continued, the contamination level of the sampled fluid decreases, particularly in the fluid flowing into the drains 50 of center interval 98. Eventually, the drains 50 of center interval 98 absorb primarily clean fluid, while contaminated fluid is routed separately via axially outlying drains 50 and the corresponding flow tubes 54 of outlying intervals 102, 104. This type of sampling can be referred to as focused sampling, however other applications can utilize normal sampling in which formation fluid is collected through a single zone/interval.

As described above, well system 20 can be constructed in a variety of configurations for use in many environments and applications. The single packer 26 can be constructed from a variety of materials and components for collection of formation fluids from single or multiple intervals within a single expansion zone. The ability to expand a sealing element across the entire expansion zone enables use of packer 26 in a wide variety of well in environments, including those having weak unconsolidated formations. The movable members 82 can be designed to pivot about an axis generally parallel with a longitudinal axis of the packer or to pivot about other axes to accommodate movement of flow tubes 54 without stressing, bending, or otherwise changing the orientation of the flow tubes. The movable members 82 also can be connected to flow tubes 54 and to collector portions 76 by other mechanisms that afford members 82 the desired mobility to accommodate radial movement of flow tubes 54. Additionally, the number of drains and corresponding flow tubes can vary from one application to another, and the location of the flow tubes relative to the outer layer can be changed as desired for specific well applications.

Figure 21:
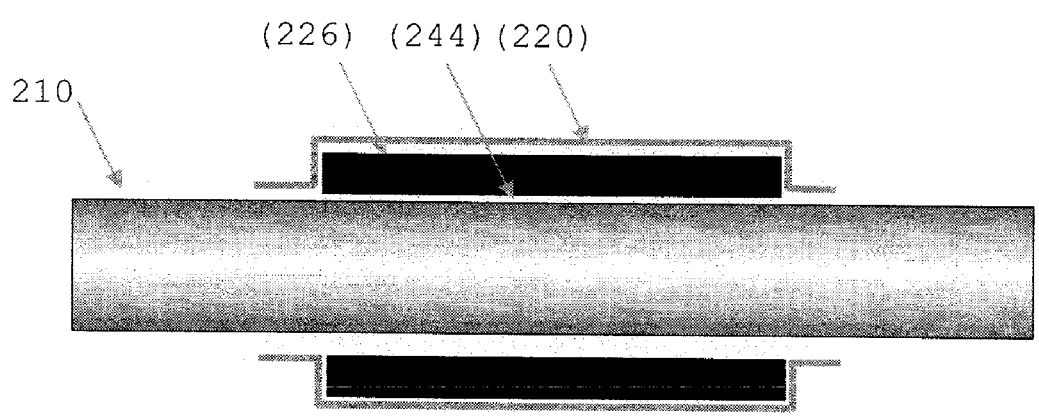
FIG. 21 illustrates an assembly for protecting an inflatable packer against oxidation during a curing procedure, according to another embodiment of the present invention.

FIG. 21 shows a method of curing a packer assembly 110 according to one embodiment of the present invention. Note that the packer assembly 110 may include any of the embodiments described above and may be used for any of the purposes/wellbore operations described above. In the depicted embodiment, the packer assembly 110 is of a single packer configuration. However, in other embodiments the packer assembly 110 may have a dual packer configuration or any other appropriate configuration. In addition, the curing method described herein is not limited to any particular packer configuration or to any particular wellbore operation in which the packer assembly 110 is ultimately used.

Figure 20:
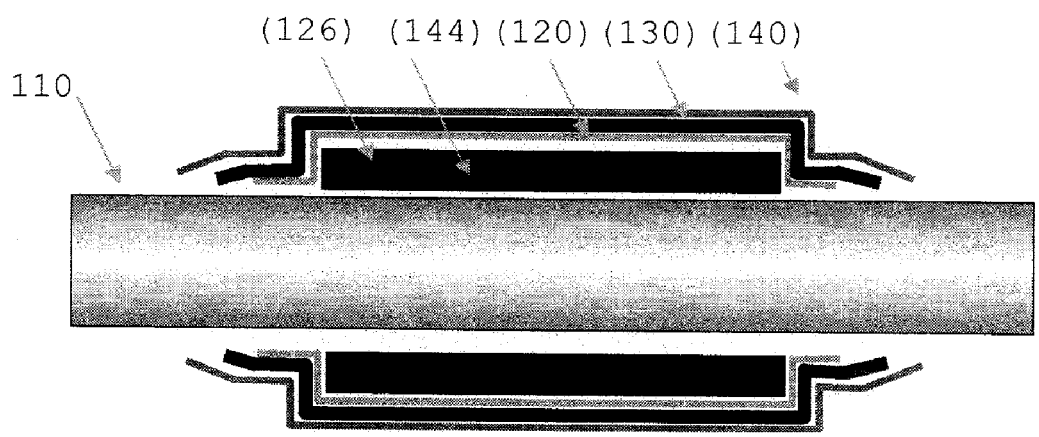
FIG. 20 illustrates an assembly for protecting an inflatable packer against oxidation during a curing procedure, according to an embodiment of the present invention.

As shown in FIG. 20, the packer assembly 110 includes an inflatable packer 126, composed of a rubber material, that is placed on a mandrel 144. This inflatable packer 126 may include an inner inflatable bladder (such as that described above with respect to reference numeral 42); and an outer layer (such as that described above with respect to reference numeral 40). In addition, the mandrel 144 may include openings or passages for directing fluid to the inner inflatable bladder during an inflation thereof. A polyamide bandage 120 is wrapped around the exposed rubber of the inflatable packer 126 to compact it during a curing operation.

To protect the rubber of the inflatable packer 126 and the polyamide bandage 120 from oxidization, a sealing layer 130, such as an additional rubber layer, is disposed around the inflatable packer 126 and the polyamide bandage 120, to seal these layers 126 and 120 from exposure to air. This sealing layer 130 may also be compacted by wrapping it in an additional or outer polyamide bandage 140.

In one embodiment, the sealing layer 140 may be composed of any material able to seal and protect the rubber of the inflatable packer 126 from being exposed to air. Such materials include a polymeric material such as a rubber material, a silicone material, or a polyamide film, among other appropriate materials.

The entire packer assembly 126 may then be cured in a pressurized air autoclave, such as a 6 bar air autoclave. During this curing, only the outer polyamide bandage 140 and the sealing layer 130 are exposed to the high pressure air. Although, the outer polyamide bandage 140 and the sealing layer 130 will oxidize during curing, the inner polyamide bandage 120 and the rubber of the inflatable packer 126 are protected against oxidation, resulting in a cured inflatable packer with improved rubber quality.

In one embodiment, the quality of the cured rubber of the inflatable packer 126 may be further enhanced by performing a vacuum operation between the sealing layer 130 and the inflatable packer 126.

In another embodiment according to the present invention, as shown in FIG. 21, a packer assembly 210 includes an inflatable packer 226, composed of a rubber material, that is placed on a mandrel 244. A polyamide bandage 220 is then wrapped around the exposed rubber of the inflatable packer 226 to compact it during a curing operation. In this embodiment, the polyamide bandage 220 includes an anti-oxidation layer which protects the underlying rubber of the inflatable packer 226 from exposure to air.

The entire packer assembly 210 may then be cured in a pressurized air autoclave, such as a 6 bar air autoclave. During this curing, the anti-oxidation layer within the polyamide bandage 220 protects the rubber of the inflatable packer 226 against oxidation, resulting in a cured inflatable packer with improved rubber quality.

Note that any of the polyamide bandages (i.e. layers 120, 140 and/or 220 discussed above) may be coated with a non-sealing anti-oxidant, or include an oxidation inhibiting additive. This coating or additive will protect the polyamide bandage to which it is applied, but will not necessarily protect any underlying layers.

The preceding description has been presented with references to certain exemplary embodiments of the invention. Persons skilled in the art and technology to which this invention pertains will appreciate that alterations and changes in the described structures and methods of operation can be practiced without meaningfully departing from the principle, and scope of this invention. Accordingly, the foregoing description should not be read as pertaining only to the precise structures described and shown in the accompanying drawings. Instead, the scope of the application is to be defined by the appended claims, and equivalents thereof.

What is claimed is:

1. A method of curing an inflatable packing comprising:
providing a packer assembly, wherein said providing comprises:
placing an inflatable packer around a mandrel;
placing a polyamide bandage around the inflatable packer; and
placing a sealing layer around the polyamide bandage to form an airtight seal about the inflatable packer,
placing an outer polyamide bandage around the sealing layer; and
curing the packer assembly, wherein the sealing layer is adapted to prevent oxidation of the inflatable packer during the curing.

2. The method of claim 1 wherein the sealing layer comprises a polymeric material.

3. The method of claim 2 wherein the polymeric material is chosen from the group consisting of a rubber material, a silicone material, and a polyamide film.

4. The method of claim 1 wherein the inflatable packer comprises a rubber material.

5. The method of claim 1 wherein the polyamide bandage is wrapped around the inflatable packer to compact it during the curing.

6. The method of claim 1 wherein the outer polyamide bandage is wrapped around the sealing layer to compact it during the curing.

7. The method of claim 1 further comprising applying a non-sealing anti-oxidant about the outer polyamide bandage or including an oxidation inhibiting additive to the polyamide bandage.

8. The method of claim 1 further comprising applying a non-sealing anti-oxidant about the outer polyamide bandage or including an oxidation inhibiting additive to the outer polyamide bandage.

9. The method of claim 1 further comprising removing the sealing layer from the packer assembly after said curing.

10. The method of claim 1 further comprising performing a vacuum operation between the inflatable packer and the sealing layer.

11. The method of claim 1 wherein the curing is performed in an air autoclave.

12. A method of curing a packer assembly comprising:
providing the packer assembly, wherein such providing comprises:
placing an inflatable packer comprising a rubber material around a mandrel;
placing a polyamide bandage around the inflatable packer; and
placing a sealing layer around the polyamide bandage to form an airtight seal about both the inflatable packer and the polyamide bandage,
placing an outer polyamide bandage around the sealing layer to compact it during the curing and
curing the packer assembly, wherein the sealing layer is adapted to prevent oxidation of both the inflatable packer and the polyamide bandage during the curing.

13. The method of claim 12 further comprising applying a non-sealing anti-oxidant about the outer polyamide bandage or including an oxidation inhibiting additive to the outer polyamide bandage.

14. The method of claim 12 wherein the sealing layer comprises a polymeric material.

15. The method of claim 14 wherein the polymeric material is chosen from the group consisting of a rubber material, a silicone material, and a polyamide film.

16. A method of curing an inflatable packing comprising:
Providing a packer assembly, wherein said providing comprises:
placing an inflatable packer around a mandrel;
placing a polyamide bandage around the inflatable packer, wherein the polyamide bandage comprises an anti-oxidation layer; and
curing the packer assembly, wherein the anti-oxidation layer of the polyamide bandage is adapted to prevent oxidation of the inflatable packer during the curing.

* * * * *